(12) United States Patent
Marchetti (10) Patent No.: US 9,473,410 B2
(45) Date of Patent: Oct. 18, 2016

(54) SYSTEM AND METHOD FOR LOAD BALANCING IN COMPUTER NETWORKS

(71) Applicant: SANDVINE INCORPORATED ULC, Waterloo (CA)

(72) Inventor: Michael Marchetti, Cambridge (CA)

(73) Assignee: SANDVINE INCORPORATED ULC, Waterloo, Ontario (CA)

( * ) Notice: Subject to any disclaimer, the term of this patent is extended or adjusted under 35 U.S.C. 154(b) by 221 days.

(21) Appl. No.: 14/230,045

(22) Filed: Mar. 31, 2014

(65) Prior Publication Data

US 2015/0281089 A1    Oct. 1, 2015

(51) Int. Cl.
| | |
|---|---|
| H04L 12/26 | (2006.01) |
| H04L 12/28 | (2006.01) |
| G06F 15/16 | (2006.01) |
| H04L 12/803 | (2013.01) |
| H04L 12/741 | (2013.01) |

(52) U.S. Cl.
CPC ............ *H04L 47/125* (2013.01); *H04L 45/74* (2013.01)

(58) Field of Classification Search
CPC ..... H04L 47/125; H04L 45/74; H04L 12/26; H04L 29/06; H04W 28/08
See application file for complete search history.

(56) References Cited

U.S. PATENT DOCUMENTS

| | | | |
|---|---|---|---|
| 2003/0076850 A1* | 4/2003 | Jason, Jr. ..................... | 370/414 |
| 2013/0254412 A1* | 9/2013 | Menezes et al. ............ | 709/228 |
| 2014/0105024 A1* | 4/2014 | Yu et al. ...................... | 370/235 |
| 2014/0341037 A1* | 11/2014 | Racz et al. .................. | 370/235 |

* cited by examiner

*Primary Examiner* — Kiet Tang
(74) *Attorney, Agent, or Firm* — Gowling WLG (Canada) LLP; Neil Henderson (57) ABSTRACT

A method and system for load balancing are provided. The method includes: receiving a tunnel frame from a traffic flow; determining whether the tunnel frame is one of a plurality of frames from a packet; if the frame is one of a plurality of frames, reassembling the plurality of frames associated with the packet to determine an inner IP header; load balancing the packet based on the inner IP header; and applying traffic policies to the packet. The system has: a traffic interface configured to receive a tunnel frame from the traffic flow; a subscriber load balancer configured to determine whether the tunnel frame is one of a plurality of frames from a packet; at least one IP reassembly engine configured to reassemble the plurality of frames associated with the packet to determine an inner IP header; and at least one flow policy engine configured to load balance the packet based on the inner IP header; and apply traffic policies to the packet.

17 Claims, 8 Drawing Sheets

SYSTEM AND METHOD FOR LOAD BALANCING IN COMPUTER NETWORKS

FIELD

The present disclosure relates generally to load balancing in computer networks. More particularly, the present disclosure relates to a system and method for load balancing network traffic.

BACKGROUND

The Internet Protocol (IP) enables computer networks to communicate with one another. Computer networks often vary in various parameters, for example, transmission speed, Maximum Transmission Unit (MTU) or the like. In order to properly communicate, computer networks need to be aware and adapt to the restrictions of other networks with which they communicate.

IP packet fragmentation may occur when the length of the IP packet (payload and headers) exceeds the MTU of a link within a network or between networks. Routers and other internet devices are programmed to handle this situation by fragmenting the IP packet into smaller size frames that meet the MTU size. An outer IP header is typically re-created on all subsequent fragmented frames to allow the network equipment to determine which frames are fragments of the initial packet.

Conventionally, on IP tunneled connections, for example, Generic Routing Encapsulation (GRE), General Packet Radio Service Tunneling Protocol (GTP), or the like, there may be a requirement to load-balance traffic on the basis of the IP packet carried within the tunnel. This type of load balancing requires access to an inner IP header, which is typically part of the packet payload. However, fragmentation of the tunneled packet generally only re-creates the outer IP header on the fragmented frames. Therefore, the inner IP header, as part of the payload, would no longer be available on subsequent fragments of the packet. Without full information included on the fragmented frames, load-balancers that are situated within the tunnel endpoints and for their function are required to balance by the inner IP header, cannot forward non-first fragments to the correct destinations. Network functions behind the load-balancing function that require the full packet (including the full payload) may experience degraded functionality.

It is, therefore, desirable to provide an improved system and method for load balancing, and in particular, in the presence of the fragmented tunneled traffic.

SUMMARY

In a first aspect, the present disclosure provides a method for load balancing network traffic including: receiving a tunnel frame from a traffic flow; determining whether the tunnel frame is one of a plurality of frames from a packet; if the frame is one of a plurality of frames, reassembling the plurality of frames associated with the packet to determine an inner IP header; load balancing the packet based on the inner IP header; and applying traffic policies to the packet.

In a particular case, the method may further include after reassembling the plurality of frames associated with the packet: determining whether there are Maximum Transmission Unit (MTU) restrictions associated with a path of the packet; if there are MTU restrictions, fragmenting the packet into a plurality of frames; and inserting a header into a subscriber payload of each frame of the plurality of frames.

In another particular case, the inserted header may include data related to the subscriber associated with the packet.

In still another particular case, the method may include diverting the packet after applying the traffic policies to the packet.

In yet another particular case, determining whether the tunnel frame is one of a plurality of frames associated with the packet may include determining whether a tunnel sending the frame fragments packets.

In still yet another particular case, determining whether the tunnel sending the frame fragments packets may include: determining the tunnel identification; and retrieving fragmentation data associated with the tunnel.

In a particular case, applying traffic policies may include sending the plurality of frames of the packet across a plurality of links to a specific flow policy engine.

In another particular case, determining of the IP header may be determined from a first frame of plurality of frames.

In still another particular case, determining of the IP header may be determined from the reassembled plurality of frames.

In another aspect, there is provided a system for packet load balancing having: a traffic interface configured to receive a tunnel frame from the traffic flow; a subscriber load balancer configured to determine whether the tunnel frame is one of a plurality of frames from a packet; at least one IP reassembly engine configured to reassemble the plurality of frames associated with the packet to determine an inner IP header; and at least one flow policy engine configured to load balance the packet based on the inner IP header; and apply traffic policies to the packet.

In a particular case, the IP reassembly engine may be further configured to: determine whether there are Maximum Transmission Unit (MTU) restrictions associated with a path of the packet; if there are MTU restrictions, fragment the packet into a plurality of frames; and insert a header into a subscriber payload of each frame of the plurality of frames.

In another particular case, the inserted header may include data related to the subscriber associated with the packet.

In still another particular case, the system may include a diverted flow policy engine configured to divert the packet after applying the traffic policies to the packet.

In yet another particular case, the subscriber load balancer may be further configured to determine if the tunnel frame is one of a plurality of frames, whether a tunnel sending the frame fragments packets.

In still yet another particular case, the system may include a tunnel fragmentation learning module configured to determine whether the tunnel sending the frame fragments packets by: determining the tunnel identification; and retrieving fragmentation data associated with the tunnel.

In a particular case, the at least one flow policy engine may be configured to perform deep packet inspection (DPI) on the packet.

In another particular case, the system may include a plurality of flow policy engines wherein the at least one IP reassembly engine is further configured to send the plurality of frames of the packet across a plurality of links to the same flow policy engine.

In still another particular case, the IP reassembly engine may be further configured to determine the IP header from a first frame of plurality of frames.

In yet another particular case, the IP reassembly engine may be further configured to determine the IP header from the reassembled plurality of frames.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides embodiments for a method and system for load balancing of network traffic. The system is intended to be located in the path of IP packet traffic flow and, in particular, to intercept IP tunnel network traffic between subscribers and servers or other destinations. The system receives a tunnel frame and determines whether the frame is a complete packet or a packet fragment and, if the frame is a packet fragment, which subsequent frames (sometimes referred to as fragments) may be a part of a single packet. The frames then may be attributed to a subscriber, a tier level, or a home network. The frames can be reassembled into a single packet or a plurality of frames depending on a Maximum Transmission Unit (MTU) of the links in a path of the packet. If the packet is reassembled into a plurality of frames, further metadata may be added to the header of each frame in order to, for example, identify the subscriber associated with the packet. The system may further analyze the packet and determine load balancing with respect to the packet and the metadata retrieved from the packet. The system may apply an appropriate policy to the packet (or plurality of frames, if the packet is reassembled this way).

Figure 1A:
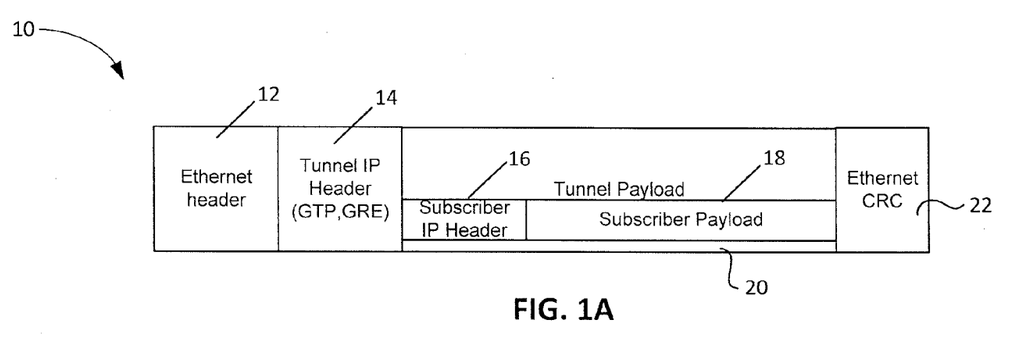
FIG. 1A illustrates an example of an un-fragmented tunnel frame.

FIG. 1A illustrates an un-fragmented tunnel frame 10, representing a single packet. The packet may be travelling to a subscriber or to another destination and may have been sent by a subscriber. The packet 10 includes header components and payload components. The header components includes an Ethernet header 12 and a tunnel IP header 14, which are configured to provide information related to source, destination, IP address, and other metadata related to the route and delivery of the packet 10 associated with the tunnel. A tunnel payload 20 may typically include an inner IP header, herein sometimes referred to as a subscriber IP header 16, and a subscriber payload 18. The packet 10 may also include a cyclic redundancy check (CRC) component 22. The CRC component 22 is an error checking code intended to be used to check for accidental changes in the raw data.

The subscriber IP header 16 contains the subscriber IP address associated with the subscriber associated with the packet. The subscriber IP address defines an internet device, for example, a mobile handset, computer connecting to a server, or the like. Within the subscriber IP header, the subscriber IP address would be the source IP should the packet originate from the subscriber, and likewise, the subscriber IP address would be the destination IP should the packet be destined to the subscriber.

Figure 1B:
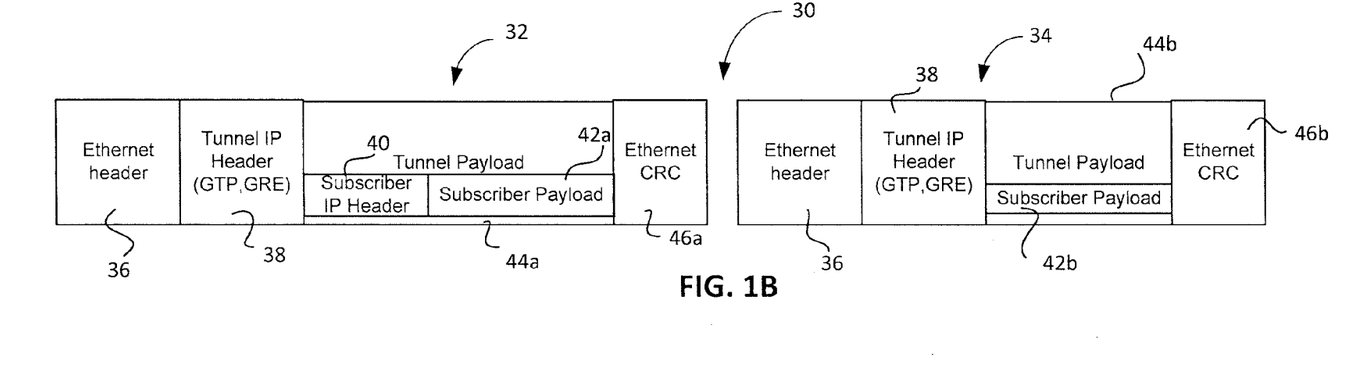
FIG. 1B illustrates an example of a fragmented tunnel frame with a plurality of frames.

FIG. 1B illustrates a tunnel frame of a fragmented packet 30 which has been fragmented into two frames 32 and 34. Each frame includes a header component with an Ethernet header 36 and a tunnel IP header 38. The payload components are divided among the frames, where the first frame 32 has a first part of the tunnel payload 20. This first part of the tunnel payload 44a includes the subscriber IP header 40, and part of a subscriber payload 42a. The second frame 34 includes the remainder of the original tunnel payload 20 associated with the packet. The second part of the tunnel payload 44b includes the remainder of the subscriber payload 42b. As illustrated, the remainder of the subscriber payload 42b does not contain a subscriber IP header 40 as, when the packet is fragmented, the subscriber IP header 40 is included at the start of the subscriber payload 42 and is not repeated in any further frames of the packet. Each frame further includes a CRC component 46a and 46b.

Although FIG. 1B illustrates a packet fragmented into two frames, it will be understood that an IP packet may be fragmented into a plurality of frames and in each frame a header component may be repeated with the payload component of the original packet subdivided among each of the plurality of frames. By fragmenting the packet, it is intended that each frame does not exceed the MTU of a link within the network or between networks, such that the data can be transmitted from a source to a destination. Generally, a frame which exceeds the MTU of a link within the network will be dropped as undeliverable and will not reach the destination.

Figure 2A:
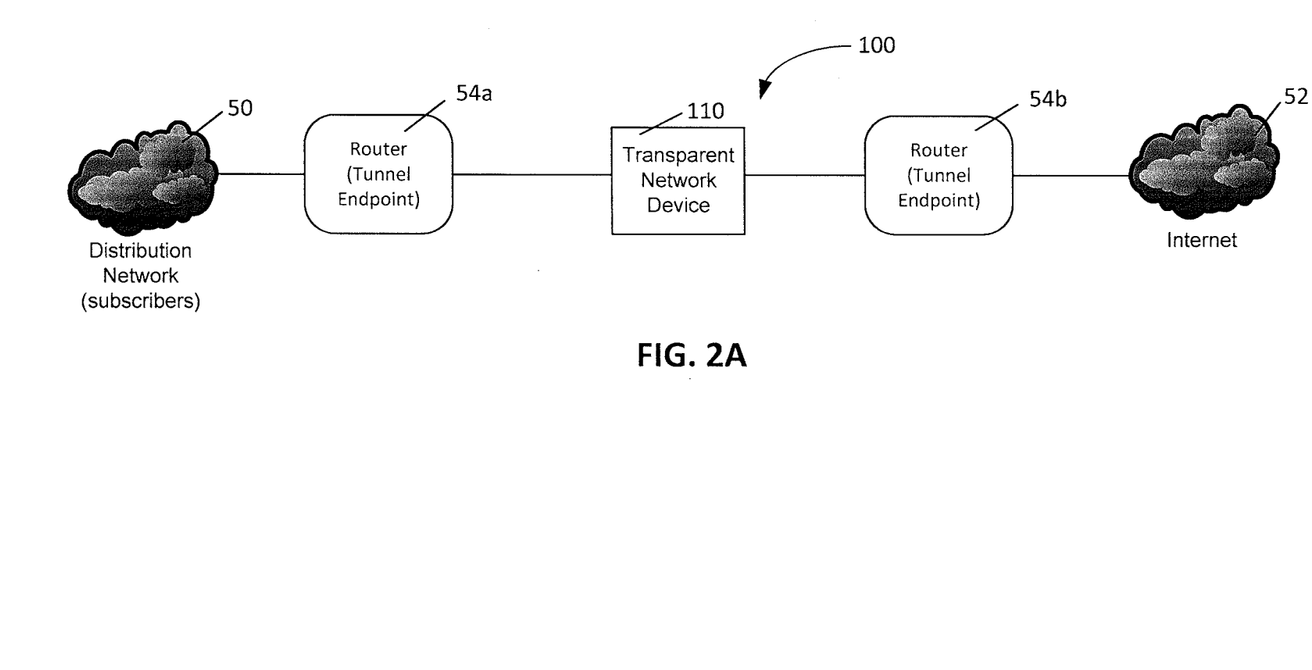
FIG. 2A illustrates a block diagram of an example environment for an embodiment of a system for load balancing.

FIG. 2A illustrates an example environment for a system 100 for load balancing. IP tunnels, for example, Generic Routing Encapsulation (GRE) are typically used to tunnel traffic from one location to another, encapsulating IP traffic, for example, from a distribution network 50 to the Internet 52. The distribution network 50 may be, for example, a network provided by an Internet Service Provider (ISP) and accessed by a plurality of subscribers of the ISP.

IP tunnels channel traffic between endpoints 54, which may be for example, routers, switches, hubs, or the like. There are many points within a network and between networks where the data of the traffic flow may need to be inspected, analyzed and load balanced. As endpoints have conventionally been tasked with inspecting, analyzing and load balancing, traffic management may be compromised at a location between the endpoints. For example, packets related to the same flow may not enter the same shaper instance, fragments of frames of packets may become out of order, internal tunnels may become overloaded or improperly balanced, or the like. Subscribers may notice a reduced quality of service or an increased time to receive a response to a request when the traffic flow is improperly balanced or the traffic management is compromised. As such, the system 100 is intended to inspect, analyze and load balance the traffic at a middle node, which is a point between the tunnel endpoints, which is intended to provide improved quality of service for the subscribers.

In various environments, in order to inspect traffic between tunnel endpoints, a middle node network device may be located between the tunnel endpoints. Referring to FIG. 2A, a network device 110 hosting the system 100 sits between the tunnel endpoints 54*a* and 54*b* and is considered a middle node network device as the network device 110 is a middle point and not an end point of the traffic flow through the network. The network device 110 is intended to provide additional network intelligent services, for example, Application Network Analytics, Traffic Management, Subscriber Usage Management, or the like. These additional network intelligent services may not work correctly on conventional network devices that do not provide for the re-assembly of fragmented packets.

An IP tunnel is an IP network communication channel which encapsulates and transports packets. A packet travelling within a tunnel is sometimes referred to as a tunneled packet or tunnel frame. A tunnel frame may refer to either a full packet or a fragment of a packet. When a tunneled packet that has been fragmented, an example of which is shown in FIG. 1B, the first frame provides a subscriber IP header, however subsequent frames for the fragmented packet will not have that subscriber IP header.

The system 100, which may be hosted on the network device 110, is configured to transparently inspect and analyze packets travelling from the distribution network 50 to the Internet 52 and from the Internet 52 to the distribution network 50. The system 100 may review the packet or packet fragments to load balance the traffic flow, by for example, applying appropriate policies to the traffic flow, or the like.

When providing network intelligence to network links with very high bandwidth, it may be necessary for the system 100 to scale horizontally. In order to horizontally scale the system 100, typically the traffic is divided into smaller manageable pieces. Traffic intelligence is typically associated with subscribers' traffic and therefore load balancing traffic is often based on a subscriber's identity. In tunneled networks, the subscriber information is determined by mapping information found within the tunnel payload, for example, information included in the Subscriber IP header. As such, fragmentation of a packet may make finding the subscriber information challenging, since it is likely to only be found in the first fragmented frame. In some cases, traffic intelligence may be associated with another metric, for example a tier of subscribers, a service or network provider or the like.

Figure 2B:
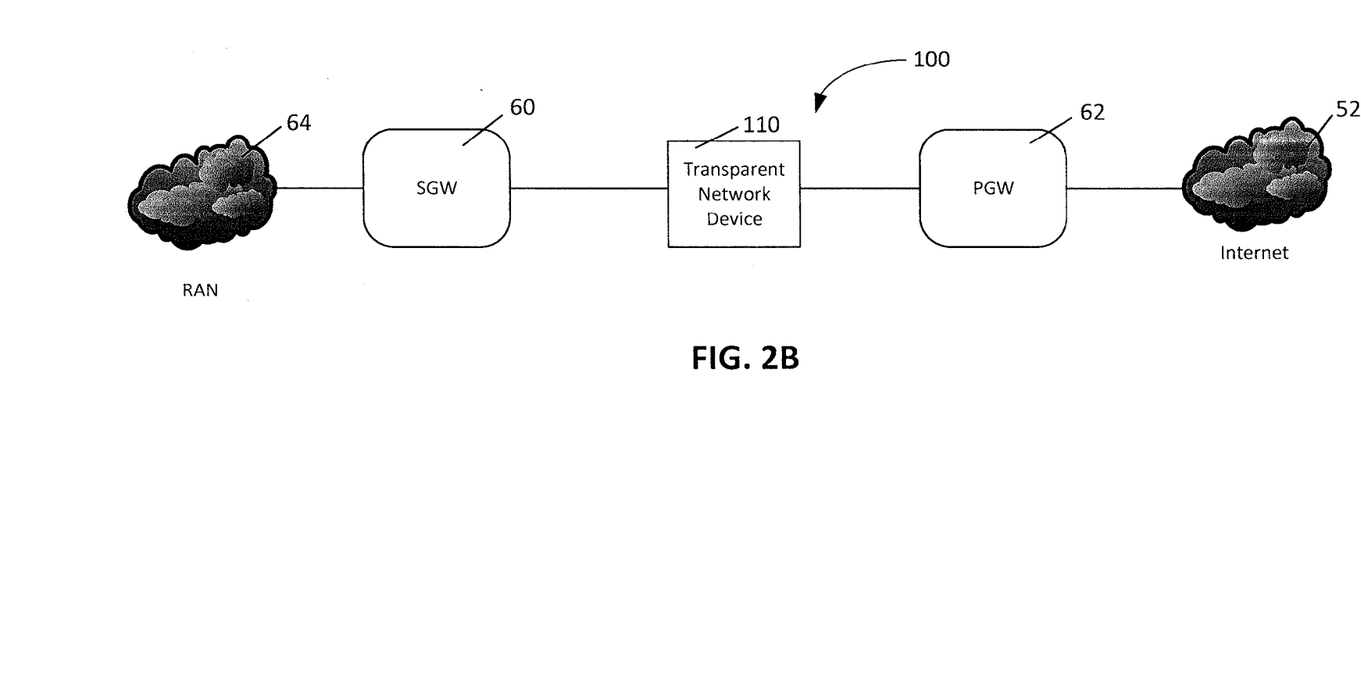
FIG. 2B illustrates another example environment for an embodiment of a system for load balancing.

FIG. 2B illustrates another example environment for the system 100 for load balancing. FIG. 2B illustrates an example relevant to wireless packet cores. If the network device 110 is inserted on the S5 link, between a Serving Gateway (SGW) 60 and a Packet Data Network Gateway (PGW) 62, traffic is GPRS Tunneling Protocol (GTP-U) tunneled, where the GTP-U payload contains the originating packet payload from a mobile handset, via a Radio Access Network (RAN) 64.

In one example, once the subscriber identity is determined directly or indirectly from the packet, the system 100 can forward all subscribers' packets (or flows), to a specific flow policy engine, which is configured to perform traffic analysis. In some cases, the system may statelessly forward the subscribers' packets in that the system is able to distinguish between and control various types of traffic protocols, for example, Transmission Control Protocol (TCP), User Datagram Protocol (UDP), or the like. This association of subscriber flows to the flow policy engine is intended to be held constant in order for the traffic flow to be properly analyzed and load balanced. Further, flow affinity is intended to be maintained for the lifetime of the flow in order to keep the flows current state in the same location, by forwarding all the packets of the flow to a specific flow policy engine.

Flow affinity may be considered a key element when providing network intelligence as network devices are intended to receive all packets for a flow. Receiving all packets may be critical in determining traffic intelligence attributes such as Mean Opinion Scores (MOS) associated with audio calls, detection of pause/rewind for streaming video, tracking URL's in the HTTP flow, or the like. Missing a fragment of a packet or a packet within a flow leaves a gap in the flow and important information may be lost such that it may not be possible to resynchronize the parsing of the given flow for further information (for future packets). In some cases, traffic intelligence may be determined from parsing the flow, although it will be understood that other ways to determine traffic intelligence may also be used.

In a fragmented packet example, similar to the fragmented packet shown in FIG. 1B, the subscriber IP address is typically not included in the second or any further frame, as the subscriber IP address is generally included in the subscriber IP header. In this situation, a conventional network device performing packet inspection and load balancing lacks the metadata to make a load balancing decision to forward the frame to the flow policy engine to maintain flow affinity with the previous packet or frame with respect to a subscriber. Conventional devices using Equal Cost Multi Path (ECMP), or Link Aggregation (LAG) may only be capable of performing actions on a single frame (since conventional devices are stateless devices, in that they do not store previous frame data). Since flow policy engines require all packets in order to determine correct traffic identification and policy decisions, the resulting incomplete packet-by-packet load-balancing may cause incorrect decision-making.

One solution may be to increase the MTU on networks carrying the tunneled traffic; however this solution may not be operationally feasible. Wireless tunneled networks having, for example, a Gn interface, a connection between a Serving GPRS Support Node (SGSN) and a Gateway GPRS Support Node (GGSN), S5 links, S1 links, or the like, typically carry home traffic as well as roaming network traffic. In the case of roaming network connections, the tunnel exists between network operators, possibly traversing multiple third party networks, and therefore not under the administrative control for one particular operator. Therefore changing the MTU on this inter-operator tunnel may not be administratively feasible. In other cases, roaming subscribers may connect to a foreign network which may include different network parameters including a more restrictive MTU.

When deploying a network device 110 such as a device hosting the system 100 for load balancing and network traffic analysis, there is a need to ensure all fragments relating to a subscriber are forwarded to the same flow policy engine to maintain flow affinity. Further, as the network device 110 is not a tunnel endpoint, as it is a transparent network device in that the network device receiving the frame should not delay the frame or have packets or fragments dropped or lost during the process. The system 100 is unable to simply terminate the tunnel and instead is intended to perform packet reassembly transparently when frames appear across multiple links in order to load balance the traffic flow.

Figure 3:
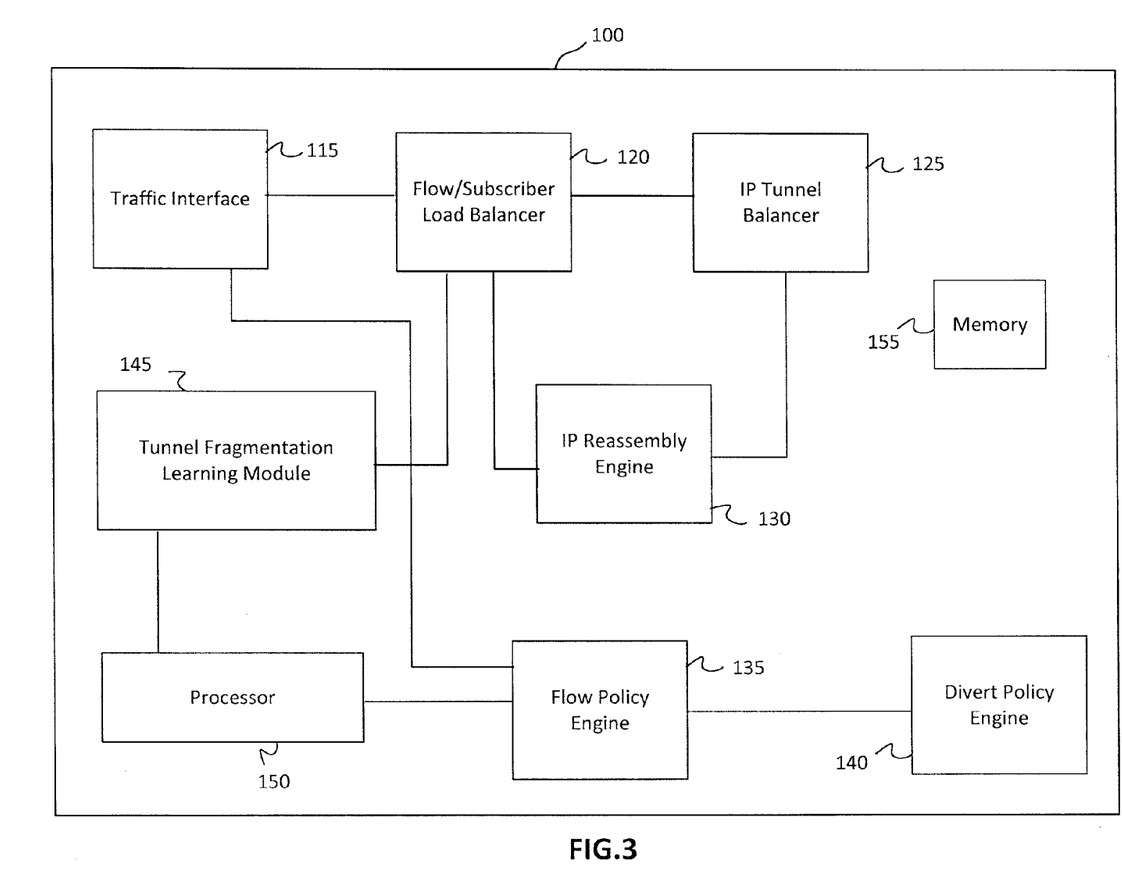
FIG. 3 illustrates an example of a system for load balancing according to an embodiment.

FIG. 3 illustrates an example embodiment of the system for load balancing. The system includes a traffic interface 115, a subscriber load balancer 120, an IP tunnel balancer 125, at least one IP reassembly engine 130, at least one flow policy engine 135, at least one divert policy engine 140, a tunnel fragmentation learning module 145, a processor 150 and a memory module 155.

In some cases, the system 100 may be distributed and may be hosted by a plurality of network devices. The system 100 includes at least one memory module 155, for example a database, designed to store data related to the tunnels, the frames, the packets and the fragments received by the traffic interface 115. The system 100 further includes at least one processing unit 150, and may include a processing unit for each component or module of the system.

Figure 4:
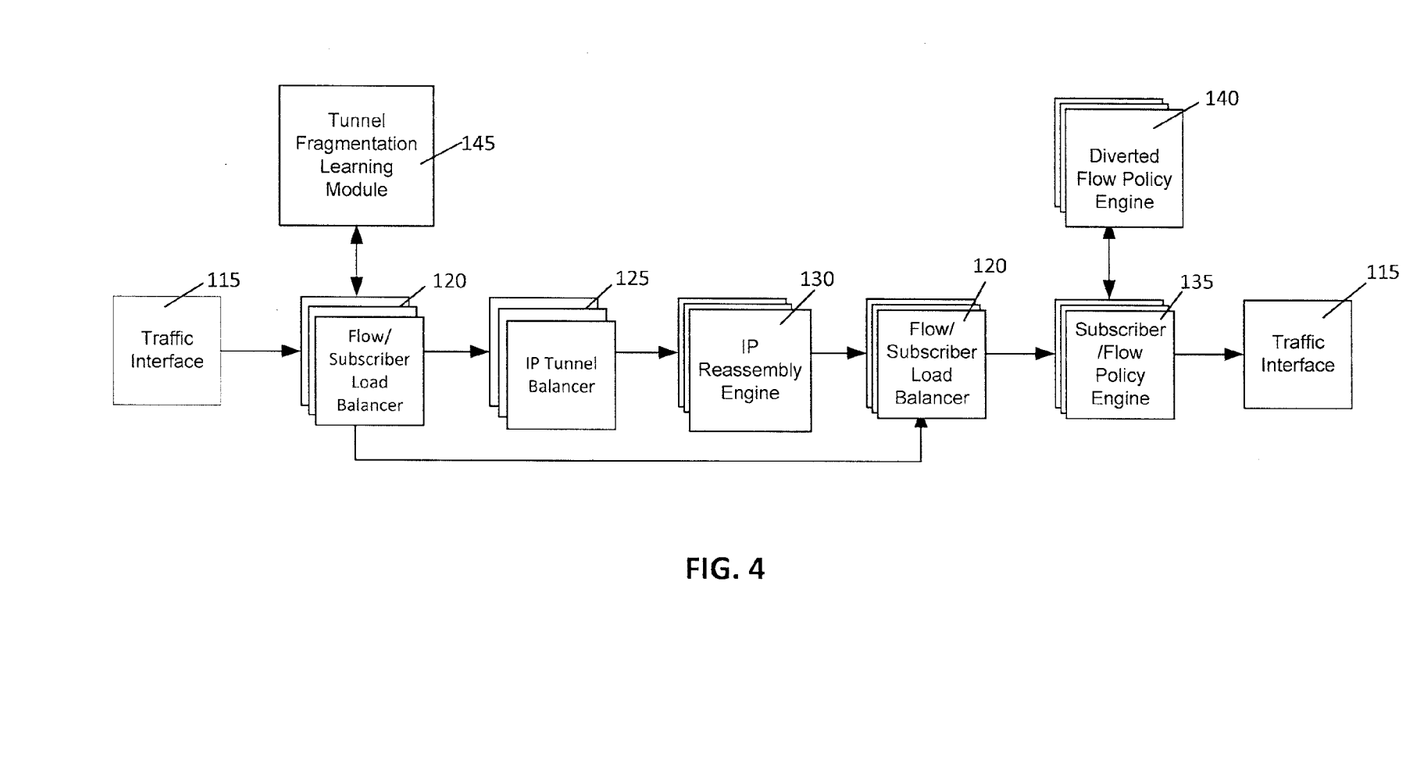
FIG. 4 is a block diagram illustrating data flow through an embodiment of a system for load balancing.

FIG. 4 illustrates data flow through the embodiment of the system 100 for load balancing shown in FIG. 3, which may be hosted in the network device 110. Tunnel frames enter the system 100 at a traffic interface module 115. The traffic interface module 115 transmits the tunnel frames to a subscriber load balancer 120.

Network traffic arrives at the subscriber load balancer 120. The subscriber load balancer 120 reads the subscriber IP header from the tunnel payload to determine a subscriber IP address. In a tunnel, for example, GRE, GTP, or the like, the data may be found in the first fragment of the tunnel frame. If it is determined that the tunnel frame is not fragmented but a single complete packet, the tunnel may be load balanced based on a parameter of interest, for example, the subscriber IP address and the packet may be forwarded to a policy engine 135. In some cases, another parameter of interest may be used to load balance the tunnel, and the subscriber load balancer 120 may balance the traffic flow based on the parameter of interest.

An example of a parameter of interest may include a secondary table lookup. By using a lookup table keyed upon the subscriber IP address, the result of the lookup could be a policy engine instance assigned to the subscriber. In this case, the table could be populated such that specific subscribers, possibly co-located in a common network topology, would be load balanced to the same flow policy engine, such that a common flow policy engine action could be employed across all subscribers. In a WI-FI hotspot, locating users that belong to the same WI-FI modem could be beneficial since the users share the same radio frequency and bandwidth, thus employing a shared managed traffic policy scheme could be used, which would be intended to provide a specific level of quality of service.

Before the subscriber load balancer 120 is able to inspect the packet and perform load balancing, the subscriber load balancer 120 determines whether IP or packet reassembly is necessary, by determining whether the frame is fragmented. In one example, the following pseudo code may be performed:

Determining if the frame should or should not be tunnel balanced; then
Check if the frame is a fragment;
  if not IP tunnel balancing may not be required and the packet may be forwarded directly to flow policy engine.

In some cases, IPv4 fragments may be identified by either IP-offset !=0 or MF=1 and IPv6 fragments may be identified by the fragment extension header.

Once the subscriber load balancer 120 has determined that the frame is a fragment of a packet and needs to be reassembled, the frames of the packet are forwarded to the IP Tunnel balancer 125. The IP Tunnel balancer 125 is configured to provide a scalable solution for IP reassembly. As such, the IP reassembly may be provided by a plurality of IP reassembly engines 130 and not limited to a single IP reassembly engine. By distributing the traffic among a plurality of IP reassembly engines 130, it is intended that the system 100 provide a more scalable solution for packet analysis and load balancing. Horizontal scaling of IP reassembly engine 130 may be accomplished by performing load balancing based on the tunnel IP header, which is supported by conventional devices that may use ECMP, LAG or the like, and is included on each frame of a fragmented packet.

The load balancing may be achieved by hashing, for example, tunnel source and destination IP addresses of the packet. By exclusive oring (XORing) the source and destination IP address, the packet may be forward to an IP reassembly engine 130 based on the hash value of this combination. All packets for the same tunnel will arrive at the same IP reassembly engine 130. It will be understood that other ways of combining the addresses in a hash may also be reasonable in that the combinations would result in the packets from the same tunnel arriving at the same IP reassembly engine 130.

In other cases, the load balancing may be achieved by hashing, for example, the source and/or destination IP and a unique IP Identification (IP ID). Although the hash algorithm is similar to the one above, in this case, the IP ID of the fragment is included. Including the IP ID is intended to allow for further scalability of IP reassembly engines 130, allowing for a plurality of IP reassembly engines 130 per IP Tunnel. The IP ID, found in the IPv4 header, is common for a fragment sequence from a tunnel source. An identification field found in the IPv6 Fragment Header may be used in the alternative of the IP ID. This solution may be used if necessary for scaling as it may introduce packet reordering on the flow since different packet fragment sequences may traverse different reassembly engines, and the packets within a flow may seem to race each other and may become reordered. As such, it is intended to be beneficial for all the frames within a tunnel to be sent to a specific reassembly engine.

Frames may not be received in order as frames of a packet may traverse different links. Depending on traffic and parameters of each link, some frames may be received by the system 100 out of order. In some cases, when the network is busier there may be a greater chance for the frames of the packets to be received out of order. Conventionally, if the frames are received out of order, it may be difficult to balance the load as the subscriber ID may not be received in the first frame as an out of order frame may be received prior to the first frame.

In this example, the IP reassembly engine 130 may, for example, create state for a tunnel 3-tuple (source IP, destination IP and IP ID). This tuple will join the packet frames or fragments, and once the IP reassemble engine 130 has determined that all of the frames for the packet have been received, the IP reassembly engine 130 will reassemble the packets into a single packet. By waiting until all of the frames have been received, the IP reassembly engine 130 may determine the first frame and retrieve the subscriber information from the frame. The packet may then be reassembled by the IP reassembly engine 130 by arranging the frames in the appropriate order. Once the frames have been arranged in order, the packet may be inspected to determine the subscriber information, or other parameters of interest, and may also further analyze the packet metadata for various applications, for example application network analytics, subscriber usage management, or the like.

In the examples above it is assumed that the connection between the IP tunnel balancer 125 and the IP reassembly engine 130 can handle any size of packet that is fully reassembled. There may be situations where this is not feasible, thus requiring fragmentation in order to meet the links' MTU restrictions, as detailed herein.

Having the fully reassembled packet, subscriber load balancing can now be performed by the system 100. With access now to tunnel payload which contains the IP header of the subscriber, load balancing can be performed in the subscriber load balancer 120 using the header similarly to ECMP and LAG implementations. The hashing of the subscriber IP and destination IP address provides a key which can be used to assign the packet to the policy engine 135. Applying this hashing principle, the packet is forwarded to the subscriber load balancer 120 to be load balanced and may be further forwarded to the policy engine 135. The system 100 may include a plurality of policy engines 135, which is intended to aid in the scalability of the system. Each policy engine 135 may be operatively connected to at least one diverted flow policy engine 140. Once the packet has been inspected and load balanced, the packet is transmitted to the traffic interface 115 and returned to the route to the destination.

The divert flow policy engine 140 is an example of another application which requires all packets of a flow. The concept of divert is a mechanism which interacts with the TCP 3-way handshake, in that the subscriber or client is transparently connected to a different server than what the client was expecting. This diverting is accomplished at the TCP connection level by effectively splicing a TCP connection from one connection to another by remapping the sequence numbers. The divert flow policy engine 140 is intended to receive all packets in order to appropriately load balance and divert the traffic flow, where necessary and/or more efficient.

Figure 5:
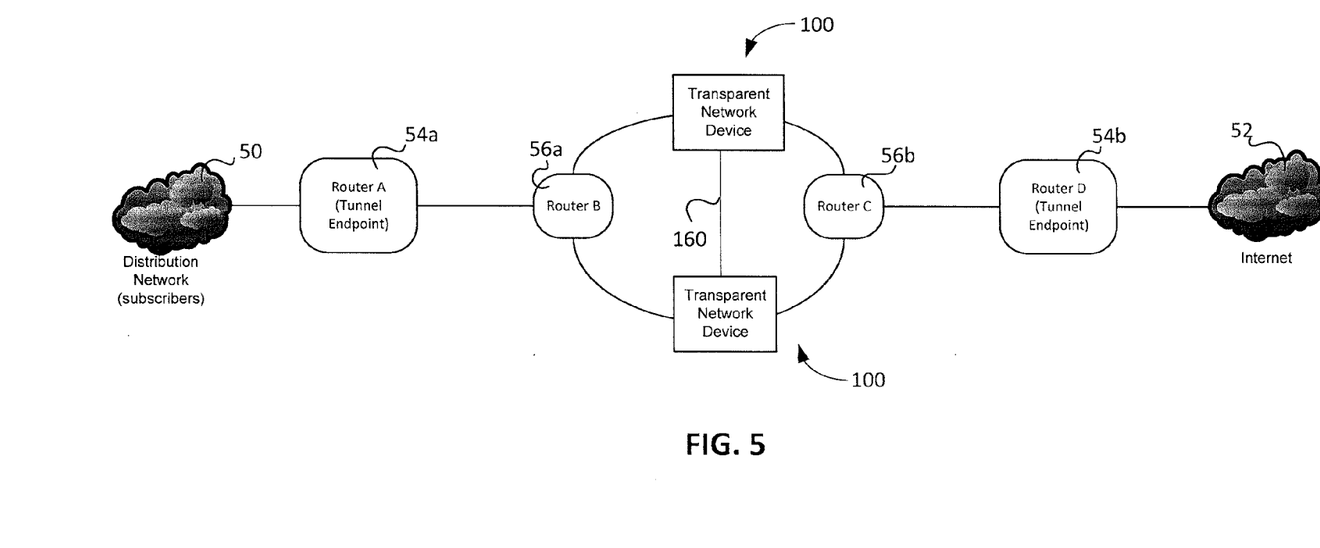
FIG. 5 illustrates another example environment of an embodiment of a system for load balancing.

FIG. 5 illustrates another example environment for the system 100. In this environment, routers 56*a* and 56*b* have been added and may be included for the purpose of adding high availability. In this environment, frames forwarded from router 54*a* will be forwarded through router 56*a* and take either of the possible paths to router 56*b*. It will be further understood that frames traveling in the other direction will be forwarded through router 56*b* and take either of the possible paths to router 56*a*.

Routers 54 and 56 may choose the next hop path by using Equal Cost Multiple Path (ECMP) route techniques, or other techniques known in the art. The routers 54 and 56 typically perform a hash of the header of the frame and use the resulting hash to determine which of the available links the frames should be forwarded on. ECMP hashing however may also suffer from being unable to properly load balance fragmented packets. Specifically, since a single tunnel connection could contain all traffic in a network, hashing the outer tunnel IP may not give a useful distribution across multiple available links. Routers 54 and 56 can therefore configure the load balancing to be frame round-robin based. This solution may cause packets in a flow to not maintain link affinity, further potentially causing fragments of a packet to traverse different links.

An embodiment of a system for load balancing in the example environment in FIG. 5 provides a mechanism for recombining packets or fragments for a particular flow across multiple links to the same policy engine. By joining or linking a plurality of components or modules of the system connected to the routers 56, one or more IP tunnel balancers and IP reassembly engines may be shared across the system, thereby reassembling the fragments such that the packets can be processed by the same policy engine as illustrated by connection 160 of FIG. 5.

Once the packet is reassembled, the subscriber load balancer 120 may scan the full packet looking for the subscriber IP header. The subscriber load balancer 120 then finds the IP address of the subscriber and may perform a hash of this address to determine which policy engine to forward the packet to.

In some cases, after IP packet reassembly, the MTU restrictions within the system are considered in association of the reassembled packet before sending the packet to the next component of the system 100, for example the subscriber load balancer 120. The next component could exist on a different internal network device and as such may be subject to MTU restrictions. The network links between the internal components may be hidden and therefore the links may generally be provisioned to be sufficiently large. Although, there may be situations where even the largest MTU link may not be sufficient. In particular, UDP frames can be very large (64 k bytes) and may not meet restrictions of even the largest MTU links. Internal MTU restrictions are more likely to be found on links between the IP reassembly engine 130, the subscriber load balancer 120, the policy engines 135 and the diverted flow policy engine 140. Other links may also have MTU restrictions.

Figure 6:
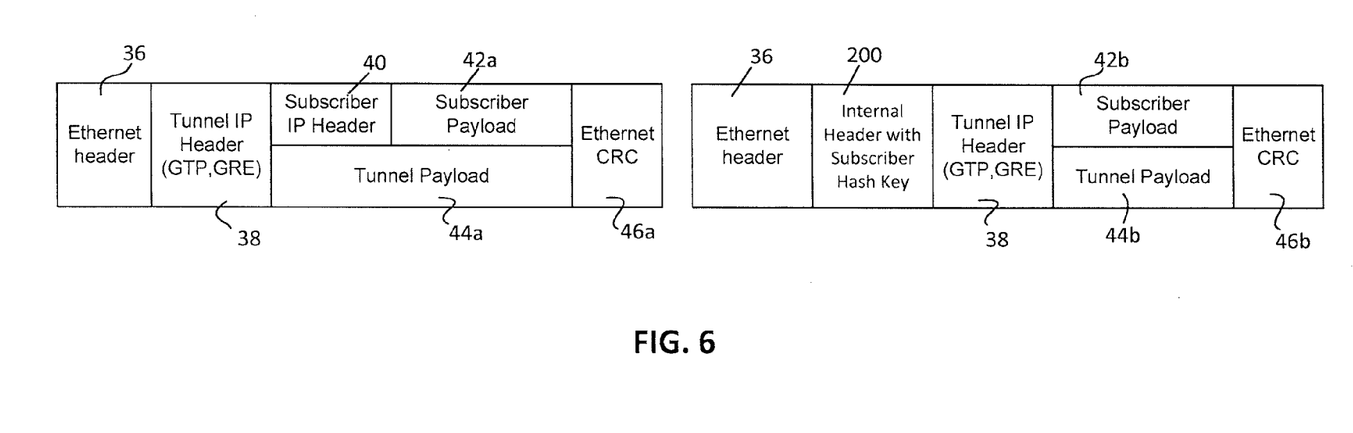
FIG. 6 illustrates an example of a tunnel frame with a plurality of frames according to an embodiment of a load balancing.

In order to handle the internal MTU restrictions and still provide a mechanism for packet inspection and load balancing on the frames, an internal header 200 is created containing metadata, for example, the subscriber hash key. The packet frame including an internal header is shown in FIG. 6. The internal header 200 may be included on each subsequent frame associated with the packet; the remaining data in the frames can be included in the header, payload and CRC elements of the frame. The packet can now be fragmented (internally) to meet the internal MTU, but also provide subscriber identity to all the frames of the packet with the additional internal header 200.

Conventionally, when performing only IP tunnel balancing on IP fragments, there exists a potential to introduce packet re-ordering which may occurs in the following example. In this example, a flow contains a number of tunnel frames, and a subset of the frames may have been fragmented between the tunnel endpoints. The fragmented packets travel through components of the system, including the subscriber load balancer 120, the IP tunnel balancer 125, the IP reassembly engine 130 and the flow policy engine 135. The packets that were not fragmented may only travel through the components of the subscriber load balancer 120 and the flow policy engine 135. Since there are potentially two packet paths for the same flow, it is expected the time to traverse these different paths would not be identical or deterministic; the packets may arrive at the policy engine 135 in a different order than the packets arrived at the traffic interface module 115. If a flow operates in this manner such that system 100 introduces packet reordering as the flow leaves system 100, this may result in reduced performance on TCP connections and UDP retransmissions. In order prevent this issue and maintain packet ordering within the flow, once the system 100 determines that fragments exist in a tunnel, all subsequent frames within the tunnel may be treated as if they were fragments of a packet so that all the frames, whether fragments or complete packets, go through the same packet path as the IP Reassembled frames. This solution is intended to allow the system 100 to reassemble the frames in order even if the frames are received out of order.

Networks may contain a plurality of tunnels, of which only a subset of the tunnels may be associated to fragmentation. The tunnels that are not fragmented do not need to have packets reassembled. However the system 100 may first determine whether a specific tunnel contains packet fragments.

In some cases, whether a tunnel contains fragments may be operator initiated, if the operator knows that fragmentation could occur on a particular tunnel. The operator could provision the system 100 to assign the particular tunnel to follow the IP reassembly path. This mechanism is subject to user error since the operator may not have sufficient information to determine that fragmentation may or may not exist on any particular tunnel.

To avoid this configuration step, the system may include a tunnel fragmentation learning module 145, as shown in FIG. 3, where the system 100 does not make explicit decisions about tunnel balancing and/or IP reassembly, but rather determines if packets are fragmented. Once determining that a tunnel flow contains fragments, the module 145 would learn that the tunnel is fragmented and subsequently force all frames within the tunnel to go through the tunnel IP reassembly. In some cases, the tunnel fragmentation learning module 145 may determine whether the node, as opposed to the tunnel, sending the frame fragments packets.

Figure 7:
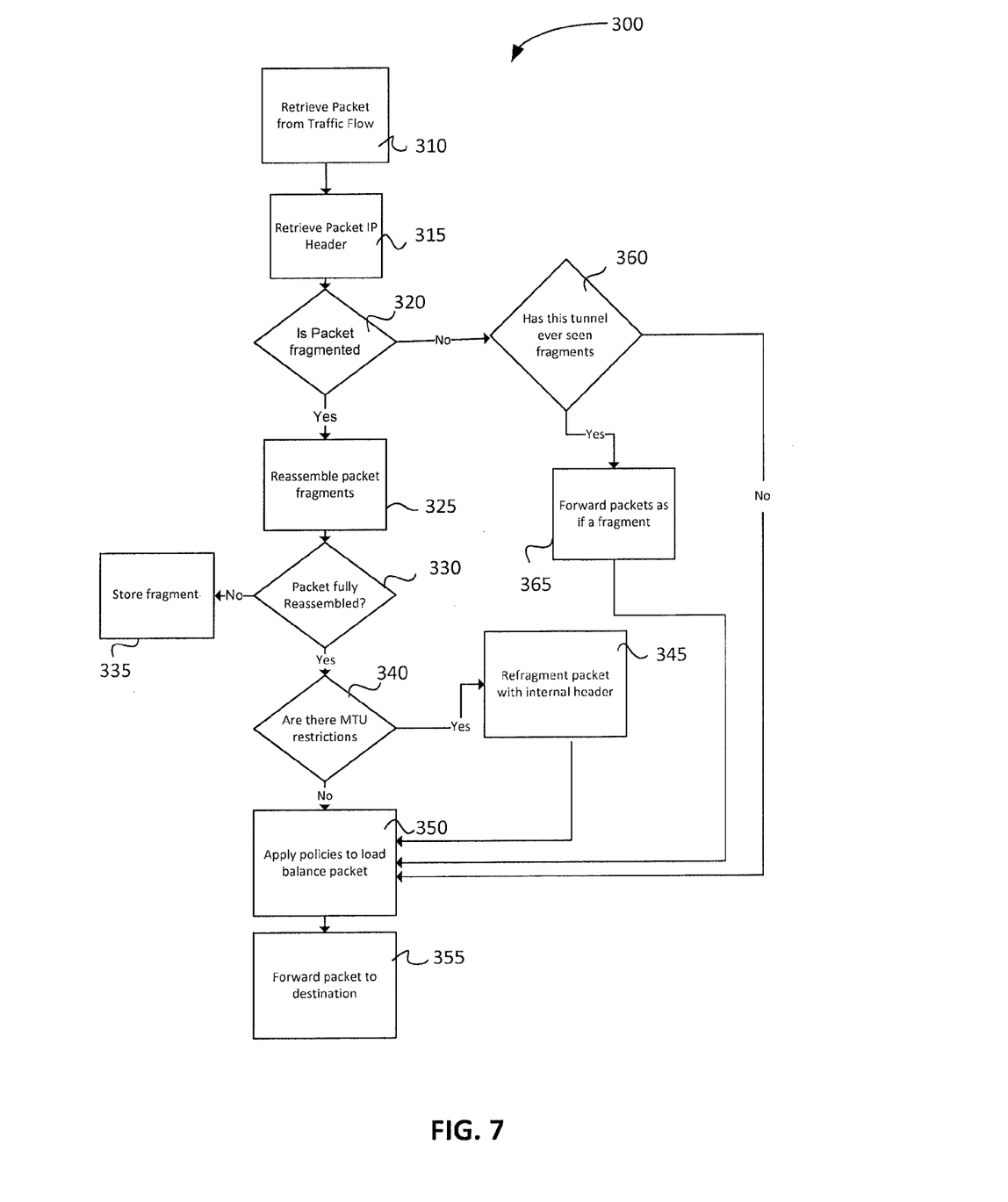
FIG. 7 is a flowchart illustrating an embodiment of a method for load balancing.

FIG. 7 illustrates an embodiment for a method 300 for load balancing network traffic. At 310, the traffic interface 115 receives a tunnel frame, which may either be a full packet or a packet fragment, from the traffic flow. At 315, the traffic interface 115 forwards the packet or frame to the subscriber load balancer 120. The subscriber load balancer 120 retrieves the packet IP header and identifies whether the frame is fragmented, at 320. If the frame is fragmented the subscriber load balancer 120 forwards the packet frame and the following packet frames to one of a plurality of IP reassembly engines 130. The IP reassembly engine 130 reassembles the plurality of frames of the tunnel frame at 325.

At 330, the system determines whether the packet has been fully reassembled. At 335, if frames are missing from the packet, the frames are stored by a memory module 155 of the system 100 so as to wait for the remainder of the frames. On receipt of a new frame, the system 100 will review the stored frame or frames to determine whether all the frames of the packet have now been received.

Once the packet is fully reassembled, the reassembled packet or the plurality of frames is forwarded to the subscriber load balancer 120. The subscriber load balancer 120 determines whether the packet needs to be re-fragmented due to any internal MTU restrictions, at 340. If so, the system 100 will re-fragment the packet and include an internal header in order to ensure the frames of the packets can be easily reassembled, at 345 and that each frame contains data in order to appropriately load balance the traffic flow.

With a fully reassembled packet, or a plurality of frames with each frame having an internal header, the packet/frames are handled by the subscriber load balancer 120, at 350. Load balancing of the frame to maintain subscriber flow affinity may be performed using the subscriber IP header or the generated internal header. The load balanced frame is forwarded to the flow policy engine 135, which is configured to apply appropriate policies to the frame.

An example policy that may be applied, as all of a subscriber's traffic flow is managed by a single policy engine, is traffic marking. A subscriber using a voice call (VOIP) while web surfing, would generally prefer to have the VOIP packets prioritized higher than the web traffic as packet drops in a VOIP call are quite noticeable and can cause an obvious decrease in voice call quality. In this case, a policy could be applied such that the VOIP packets are marked (DSCP IP marked), such that downstream devices could be made aware of the higher prioritized traffic should the downstream devices become congested. When the downstream device realizes congestion, the device could choose frames that are lower in priority to drop in order to relieve the congestion (in this case, the web traffic). With the appropriate policies applied to the packet, the packet is then forwarded to the traffic interface 115 to be transmitted to the destination, at 355.

In some cases, at 320, the system 100 will determine that the frame is not fragmented, but is instead a complete packet. The tunnel fragmentation learning module 145 will receive the packet, at 360, to determine whether tunnel associated with the packet has previously had fragments. At 350, if the tunnel has not had fragments, the packet is forwarded the subscriber load balancer 120 for load balancing. At 365, if the tunnel has previously had fragments, the packet is forwarded to as though the packet is fragmented, and may be received by the IP tunnel balancer 125 and the IP reassembly engine 130. In this case, reassembly may not be performed as the system 100 would determine reassembly is not required for the packet. The packet would be determined to be fully reassembled and would be forwarded through the system 100. As other packets in the traffic flow may be fragmented, flowing the non-fragmented packet through the system 100 is intended to maintain packet ordering within a flow as previously described herein.

As the method takes place in a middle point between the source and the destination of the packet, it is intended that the process be transparent, i.e. the node receiving the packet should not experience delay or have packets or fragments dropped or lost during the process. The system 100 is intended to inspect the packet by reassembling the packet to perform subscriber load balancing without adversely affecting the traffic flow.

In the reassembly of fragments into a packet, the system 100 may be configured to wait a predetermined amount of time for the fragments of the packet to be received. If the amount of time expires without receiving a complete packet, the system 100 may determine whether to discard or forward the saved fragments according to a predetermined configuration of the system 100. Should packet loss occur in the network, it may be advantageous to limit the wait time for the fragments to minimize the possibility of the fragment key (for example, IP ID) to be re-used before the packet has been reassembled. For example, the predetermined wait time may be 1 millisecond, 1 second, 5 seconds or the like.

The tunnels described have assumed that the tunnel payloads are unencrypted. In some cases, the tunnels could be utilizing IPSec such that the payload of the packet is encrypted. The subscriber load balancer 120 may not be able to determine the contents of the tunnel payload of the packet. Although the system is not intended to terminate the tunnel (as the system is not a tunnel endpoint), system 100 may be configured such that the system and a tunnel may be provided with a shared secret key, such that the subscriber load balancer 120 may decrypt the tunnel payload so that subscriber load balancing and policy may be performed. The tunnel payload may then be re-encrypted using the same shared secret key and sent to the destination. In some cases, the packet may not be decrypted in-place and instead only enough of the inner IP header information to properly reassemble the packet may be decrypted. In other cases, subsequent fragments may not be decrypted and may instead receive an extra header to associate the fragments to the packet.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for load balancing network traffic comprising:
    receiving a tunnel frame from a traffic flow;
    determining whether the tunnel frame is one of a plurality of frames from a packet;
    if the tunnel frame is one of a plurality of frames, reassembling the plurality of frames associated with the packet to determine a subscriber Internet Protocol (IP) header, and generate an inner IP header based on the subscriber IP header and comprising metadata related to subscriber identity;
    determining whether there are Maximum Transmission Unit (MTU) restrictions associated with a path of the packet;
        if there are MTU restrictions, fragmenting the packet into a plurality of re-fragmented frames; and
        inserting the inner IP header into a subscriber payload of each frame of the plurality of re-fragmented frames;
    load balancing the packet or re-fragmented frames based on the metadata related to subscriber identity; and
    applying traffic policies to the packet or re-fragmented frames.

2. The method of claim 1 further comprising diverting the packet or re-fragmented frames after applying the traffic policies to the packet or re-fragmented frames.

3. The method of claim 1 wherein, determining whether the tunnel frame is one of a plurality of frames associated with the packet comprises determining whether a tunnel sending the frame fragments packets.

4. The method of claim 3 wherein, determining whether the tunnel sending the frame fragments packets comprises:
    determining the tunnel identification; and
    retrieving fragmentation data associated with the tunnel.

5. The method of claim 1 wherein the applying traffic policies comprises sending the plurality of frames of the packet across a plurality of links to a specific flow policy engine.

6. The method of claim 1, wherein the determining of the IP header is determined from a first frame of the plurality of frames.

7. The method of claim 1, wherein the determining of the IP header is determined from the reassembled plurality of frames.

8. A system for load balancing comprising:
    at least one processor coupled to a memory storing instructions executable by that at least one processor to implement:
    a traffic interface configured to receive a frame packet from a traffic flow;
    a subscriber load balancer configured to determine whether a tunnel frame is one of a plurality of frames from a packet;
    at least one Internet protocol (IP) reassembly engine, configured to reassemble the plurality of frames, wherein the IP reassembly engine is further configured to:
    determine a subscriber IP header associated with the packet;
    generate an inner IP header based on the subscriber IP header and comprising metadata related to subscriber identity;
    determine whether there are Maximum Transmission Unit (MTU) restrictions associated with a path of the packet;
        if there are MTU restrictions, fragment the packet into a plurality of frames; and
        insert the inner IP header into a subscriber payload of each frame of the plurality of frames; and
    at least one flow policy engine configured to load balance the packet or re-fragmented frames based on the metadata related to subscriber identity and apply traffic policies to the packet or re-fragmented frames.

9. The system of claim 8 further comprising a diverted flow policy engine configured to divert the packet or re-fragmented frames after applying the traffic policies to the packet.

10. The system of claim 8 wherein, the subscriber load balancer is further configured to determine if the tunnel frame is one of a plurality of frames, whether a tunnel sending the frame fragments packets.

11. The system of claim 10 further comprising, a tunnel fragmentation learning module configured to determine whether the tunnel sending the frame fragments packets by:
    determining the tunnel identification; and
    retrieving fragmentation data associated with the tunnel.

12. The system of claim 8 wherein the at least one flow policy engine is configured to perform deep packet inspection (DPI) on the packet.

13. The system of claim 8 comprising a plurality of flow policy engines wherein the at least one IP reassembly engine is further configured to send the plurality of frames of the packet across a plurality of links to the same flow policy engine.

14. The system of claim 8, wherein the IP reassembly engine is further configured to determine the IP header from a first frame of plurality of frames.

15. The system of claim 8, wherein the IP reassembly engine is further configured to determine the IP header from the reassembled plurality of frames.

16. The method of claim 1 wherein the tunnel frame is received at a middle node between tunnel endpoints.

17. The system of claim 8 wherein the system is a middle node located between tunnel endpoints.

\* \* \* \* \*